United States Patent Office 3,434,947
Patented Mar. 25, 1969

3,434,947
PROCESS FOR THE SEPARATION OF IRON FROM METAL SULPHATE SOLUTIONS AND A HYDRO-METALLURGIC PROCESS FOR THE PRODUCTION OF ZINC
Georg Steintveit, Eitrheim, Odda, Norway, assignor to Det Norske Zinkkompani A/S, Eitrheim, Odda, Norway
No Drawing. Filed Dec. 29, 1965, Ser. No. 518,760
Claims priority, application Norway, Apr. 30, 1965, 157,894
Int. Cl. C22d 1/24, 1/22
U.S. Cl. 204—119                              7 Claims

ABSTRACT OF THE DISCLOSURE

Complex basic iron sulphate having good decanting and filtering qualities is precipitated from a solution of iron and metal sulphate solutions, particularly zinc sulphate, by precipitating the complex basic iron sulphate in the presence of K, Na, or $NH_4$ ions at a temperature below the boiling point of the solution at atmospheric pressure.

---

This invention relates to a process for the separation of iron from metal sulphate solutions of the type obtained in the hydrometallurgic production of zinc, and more particularly in an improved hydrometallurgic treatment of ores for maximum recovery of Zn, Cu, Cd, Pb and Ag in the ores.

The raw material for the hydrometallurgic production of zinc, is commonly that known by the designation "Calcine" and is produced by roasting zinc-sulphide concentrates.

The resulting roast product may contain 50–65% Zn, substantially in the form of zinc oxide, zinc sulphate and zinc ferrite. The two first mentioned products are easily dissolved by the leaching processes in general use. The zinc ferrites are, however, insoluble in the diluted sulphuric acid of usual leaching conditions.

While the roasting process is conducted in such a way that as many acid-soluble zinc compounds as possible are formed, it is, however, impossible to prevent a part of the zinc content from combining with the iron in the ore to form the said insoluble ferrites.

The leach yield of zinc is thus limited by the insoluble zinc ferrites and, with an iron content in the calcine of e.g. 9–5% in the usual hydrometallurgic processes, it is between 87 and 93%.

In the generally known processes it is important to avoid leaching to such an extent that large amounts of iron are dissolved. This is achieved in part by producing the roast product by means of hearth roasting, flash roasting or fluidization roasting, whereby only e.g. 10–20% of the iron present becomes acid-soluble, and, in part, by maintaining the acid strength and temperature during the leaching at such a level that the zinc ferrites are not attacked.

A significant problem in the hydro-metallurgic production of zinc is the separation of iron and zinc from the zinc sulphate solution and, in accordance with the general practice up to the present time, it has been found that the problem cannot be solved if the iron concentration in the sulphate solution becomes too high before the final neutralizing and purifying steps are carried out.

The same practice is followed by all the known methods, however, in principle, they may be conducted continuously or discontinuously, so that the process may vary somewhat.

In the continuous method the leaching may be conducted in the following two stages: (a) the neutral leaching where calcine is added in excess, up to a pH of 4.5–5.0, to a mixture containing 50–100 g./l. $H_2SO_4$ of regenerated sulphuric acid from the electrolysis, the so-called spent acid, and an impure, decanted zinc solution from the (b) acid leaching, where the separated slurry is treated with an excess of spent acid.

It is very important to the subsequent decanting and filtering operations that the iron content in the sulphate solution is not in excess of e.g. 1–2 g./l., and the acidity may not therefore be lower than pH 2.5–3.5. The zinc extraction is therefore limited by these conditions in the acid leaching stage.

A modification of this method is the primary acid leaching of the calcine, and thereafter the neutralizing and precipitation of the iron in the decanted solution. The extraction is, however, limited in the same manner by the fore-mentioned conditions.

In the discontinuous or batch method the leaching is conducted in portions, by that a quantity of calcine is dissolved in a measured amount of regenerated sulphuric acid electrolyte containing e.g. 200–280 g./l. $H_2SO_4$, the method being carried out in two stages, one immediately following to the other, such that:

In the acid stage, a part of the calcine is treated at temperatures of up to 90–100° C. at a final acid strength of 40–60 g./l. $H_2SO_4$.

The remaining sulphuric acid is subsequently neutralized by renewed addition of calcine; acid is again added, if necessary, and again calcine until all the acid is neutralized to a pH of 4–5 and the iron is completely precipitated.

A relatively intense extraction is obtained by the first part of this leaching since some of the zinc ferrites present are somewhat attacked, and the iron content, as an exception, may rise to 12–25% g./l., according to that disclosed in Trans AIME 1936, vol. 121, page 531. However, since these amounts of iron can cause great filtering problems, the general practice at present, to a great extent, aims at not attacking the ferrites substantially, and thus limits the iron concentration before neutralizing to a few g./l. only.

In the neutralizing stage, the iron is again precipitated as a mixture of ferri-hydroxide and basic iron sulphate, resulting in a pulp which is subjected to direct filtering in special filters, the so-called Burt filters.

After both the above said leaching processes, the washed-out final residue will still contain 18–22% Zn, further, 30–40% of copper content, 10–30% of cadmium content and practically speaking all lead and silver present in the original calcine. The fact that lead and silver cannot be recovered directly as biproducts by this process is a great disadvantage of the hydro-metallurgic zinc method.

The residue from the present hydro-metallurgic methods is thus still a valuable material, and therefore, it is often subjected to further treatment, mainly in a thermal manner, in order to recover the remaining metal values.

According to Canadian Patent No. 663,664 and Australian patent application No. 13,245/62 it is proposed to recover a part of the metal values by the wet process. In accordance with these patents it is proposed that the leaching residue be treated in autoclaves at temperatures of 140–260° C. with a final acid strength of 40–50 g./l. $H_2SO_4$ under reducing conditions, whereby the zinc ferrites are decomposed and zinc and iron are relatively completely dissolved. The solution is then subjected, still under pressure and a temperatures of 140–260° C., to an oxidizing atmosphere, whereby the greater part of dissolved iron will be precipitated as basic ferrisulphate in the strongly acid environment present in the pressure apparatus, while zinc, copper and cadmium are recovered as dissolved sulphates. Lead and silver are lost, however, with the precipitated iron.

As will be clear from the above, the metal yield of the hydro-metallurgic zinc process is limited, in the methods known hitherto, to the separation of iron and zinc in the sulphate solution since the iron is mainly precipitated as voluminous hydroxides having qualities which cause great difficulties in decanting and filtering.

According to the said patents, it has also been proposed recently to precipitate iron as basic sulphate in a strongly acid solution, at temperatures far above the boiling point of the liquid. These process conditions, which require complicated pressure apparatus, are very difficult to achieve in commercial operation.

The process according to the present invention is based on the discovery that it is possible to cause basic iron sulphate to precipitate from zinc-iron sulphate solutions containing e.g. 150–180 g./l. Zn and 20–35 g./l. Fe, at temperatures limited upwardly to the boiling point and preferably ca. 95° C., by gradual neutralization of the free acid down to 3–5 g./l. $H_2SO_4$ or to an optimum pH of 1.5. According to the invention use is also made of the fact that the basic iron sulphate will have a substantially crystalline character having good decanting and filtering qualities by reason of the simultaneous presence of certain other ions in the solution. These ions may be $K^+$, $Na^+$ or $NH_4^+$, which will then be included in the solution subjected to precipitation consisting of $Fe^{+++}$, $SO_4^{--}$, $OH^-$, $H_2O$ and the said ions.

The Spanish Patent No. 304,601 describes a similar process of precipitation of basic iron sulphate, but in accordance with this, it is necessary to limit the iron concentraiton to 14–15 g./l. by diluting, either with zinc sulphate solution or spent electrolyte, before precipitation of the basic iron sulphate takes place.

In accordance with the present invention this limitation is unnecessary, since the precipitation is controlled by the said ions $K^+$, $Na^+$ and/or $NH_4^+$. This is a great advantage in practice, particularly in the treatment of raw materials having a higher than usual content of iron.

The invention thus relates to a process for the separation of Fe from metal sulphate solutions, particularly zinc-sulphate-containing solutions having an iron content of 20–35 g./l. Fe, and the process is characterized in that the iron is precipitated as a complex basic sulphate in the presence of $K^+$, $Na^+$ and/or $NH_4^+$ ions. In the process according to the invention the concentration of $K^+$, $Na^+$ and/or $NH_4^+$ ions is preferably $\frac{1}{10}$–$\frac{1}{4}$ of the iron content present in g./l. The metal sulphate solution of the process according to the invention, is preferably produced by acid leaching of a residue formed by a hydrometallurgic process.

The invention also relates to a hydrometallurgic recovery procedure for the production, in an advantageous way, of the zinc sulphate solution from which the iron is to be precipitated, and the Zn, Cu, Cd, Pb and Ag from the ore. In accordance with this procedure the ore containing iron and the other metals referred to is subjected to a neutral leaching with $H_2SO_4$ under such conditions that as little iron as possible is dissolved, the solution, after purifying, being conveyed to the electrolysis and separated from a residue. The solution from which the iron is to be precipitated is obtained from this residue by subjecting it to an acid leaching with a mixture of spent electrolyte and concentrated $H_2SO_4$, the residue and the acid amount being adjusted so that the acid strength, after final residue leaching, is 80–120 g./l. $H_2SO_4$, whereafter the acid is neutralized with a suitable neutralizing agent to 40–50 g./l. $H_2SO_4$, the residue containing the lead and silver is separated and removed, before or after the neutralization, and the resulting separated solution is collected.

This is the solution from which the iron content is to be precipitated. It contains the metals Fe, Zn, Cu and Cd and is brought to a temperature limited upwardly to the boiling point, and preferably 95° C., while the pH with above mentioned neutralizing agent is brought to a maximum pH of 1.5 for precipitation of the complexed basic iron sulphate in the presence of $K^+$, $Na^+$ and/or $NH_4^+$ ions, whereafter the solution, during usual separation of the precipitate and possible reconcentrating, is re-cycled in order to be mixed with spent electrolyte for use in leaching of the ore. Leaching of the residue is conducted preferably with an acid mixture containing 180–250 g./l. $H_2SO_4$ at a temperature of 85–110° C. and preferably 95° C.

The process of recovering metal values in a residue from the hydrometallurgic zinc production will then be:

A residue having a zinc content of e.g. 18–35% is leached in spent acid with 150–200 g./l. $H_2SO_4$, with extra sulphuric acid optionally added to produce an acid strength of e.g. 250 g./l. $H_2SO_4$, at a temperature limited upwardly to the boiling point, and e.g. at 90–106° C. for e.g. 3 hours, whereby after final leaching the final acid may contain e.g. 80–120 g./l. $H_2SO_4$. Under these conditions the zinc ferrites will be decomposed and a final residue will be formed which contains the lead and silver of the zinc ore, together with the undissolved rock minerals. 98–99% of the zinc, copper and cadmium content, and further, 80–90% of the iron content in the residue is dissolved by this treatment. The lead and silver residue is now easily separated from the zinc-iron-solution on decanting. The acid sulphate solution, which then contains zinc, copper, cadmium and iron, is freed from its iron content by a special iron-precipitation procedure described below.

While maintaining a temperature of ca. 95° C., a neutralizing agent is gradually added to the decanted acid sulphate solution, this neutralizing agent may be zinc oxide; for instance zinc oxide recovered from slag-fuming of copper or lead slags, calcine having low iron content, or another suitable zinc-containing neutralizing agent.

During the course of 3–4 hours, while maintaining the resulting solution at a temperature of e.g. 95° C. and a maximum pH of 1.5, the iron will be precipitated as basic sulphate. This precipitation will be particularly complete when $K^+$, $Na^+$ or $NH_4^+$ is added, in advance or during the course of the period of precipitation, singly or in mixture of e.g. 1–6 g./l.

The $Fe^{++}$ possibly present is oxidized to $Fe^{+++}$ by means of $MnO_2$.

One advantageous procedure is to conduct a partial neutralizing from 80–120 g./l. $H_2SO_4$ down to 40–50 g./l. $H_2SO_4$ before the silver and lead residue is separated, and thereafter continue the complete neutralization to an optimum pH of 1.5 for the precipitation of the iron, whereby possible lead and silver content in the zinc oxide respectively in the Calcine, or possibly other zinc containing neutralizing agents, may also be recovered for the most part.

I claim:
1. In a process for the separation of iron from metal sulphate solutions, particularly zinc sulphate solutions containing iron in the recovery of zinc, and in which such solutions have an iron content of from 20 to 35 g./l., wherein the improvement comprises precipitating the iron content of such a solution as a complex basic iron sulphate in the presence of an added ion selected from the group consisting of K, Na and $NH_4$ and mixtures thereof designed to facilitate the precipitation of the iron content of the solution as a complex basic iron sulphate having good decanting and filtering qualities, the solution from which the iron is being precipitated having a maximum pH of 1.5 and the precipitation of the basic iron sulphate being effected at a temperature less than the boiling point of the solution at atmospheric pressure.

2. A process as claimed in claim 1, wherein the metal sulphate solution is produced by acid leaching a residue formed in the hydrometallurgic treatment of an ore containing zinc and iron for the recovery of zinc.

3. A process as claimed in claim 2, wherein the ore from which said metal sulphate solution is produced is leached with sulphuric acid to produce an initial solution and an initial residue the latter of which is separated from the solution and leached with a mixture of spent sulphuric acid electrolyte and concentrated sulphuric acid, neutralizing the resulting mixture with a neutralizing agent to a sulphuric acid content of from 40 to 50 g./l., and separating the resulting solution from the residue content of the mixture to produce said solution from which iron is to be precipitated.

4. The process as claimed in claim 4, wherein said initial residue is leached with an acid mixture containing from 180 to 250 g./l. $H_2SO_4$ at a temperature of from 85 to 110° C.

5. A process as claimed in claim 1, wherein the concentration of said added ion in the solution amounts to from $\frac{1}{10}$ to $\frac{1}{4}$ in g./l. of the iron content of the solution.

6. A process as claimed in claim 3, wherein said initial residue in addition to its content of zinc and iron also contains Cu, Cd, Pb and Ag and wherein said metal sulphate solution from which its iron content is precipitated as a complex basic iron sulphate is separated from Pb and Ag and contains Fe, Zn, Cu and Cd.

7. In a process for production of zinc and for maximum recovery of Zn, Cu, Cd, Pb and Ag from an ore, in which the ore is subjected to a neutral leaching with sulphuric acid under such conditions that as little as possible of the iron content is dissolved, the solution, after purifying, being conveyed from the separated residue to an electrolytic recovery system, wherein the improvement comprises subjecting the separated residue to an acid leaching with a mixture of spent electrolyte and concentrated sulphuric acid, the residue and the acid content being adjusted in such a way that the acid strength, after final residue leaching, is 80–120 g./l. $H_2SO_4$, thereafter neutralizing the acid to 40–50 g./l. $H_2SO_4$ to a maximum pH of 1.5, removing the residue containing the lead and silver, collecting the separated solution, which contains the metals Fe, Zn, Cu and Cd and bringing it to a temperature limited upwardly to its boiling point at atmospheric pressure, precipitating the iron content of the solution as a complex basic iron sulphate in the presence of added $K^+$, $Na^+$ and/or $NH_4^+$ ions, and thereafter separating the solution from the precipitated complex basic iron sulphate.

References Cited

UNITED STATES PATENTS

| | | | |
|---|---|---|---|
| 1,503,229 | 7/1924 | Clark | 75—108 |
| 1,834,960 | 12/1931 | Mitchell | 75—115 |
| 2,296,423 | 9/1942 | Clark | 23—126 |
| 2,739,040 | 3/1956 | Mancke | 23—126 |

L. DEWAYNE RUTLEDGE, *Primary Examiner.*

T. R. FRYE, *Assistant Examiner.*

U.S. Cl. X.R.

23—126, 51; 75—108, 121, 120